J. Daykin,
Windlass Water Elevator,
No. 1,712, Patented June 28, 1864.
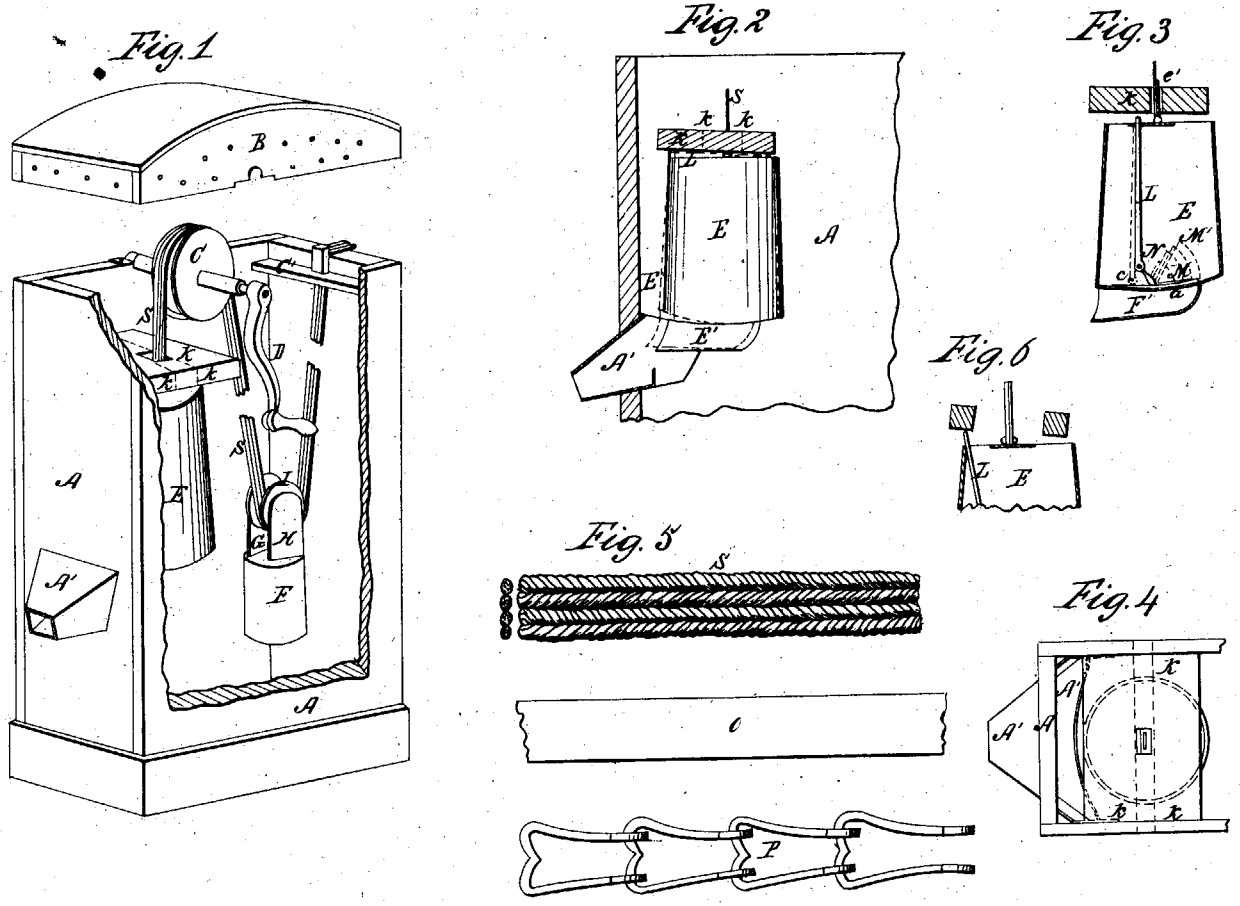
Witnesses;
W. H. Burnage
J. Holmes
Inventor;
James Daykin
N. PETERS, PHOTO-LITHOGRAPHER, WASHINGTON, D. C.

UNITED STATES PATENT OFFICE.

JAMES DAYKIN, OF CLEVELAND, OHIO.

IMPROVED METHOD OF ELEVATING AND DELIVERING WATER FROM WELLS.

Specification forming part of Letters Patent No. 29,677, dated August 21, 1860; Reissue No. 1,712, dated June 28, 1864.

*To all whom it may concern:*

Be it known that I, JAMES DAYKIN, of Cleveland, in the county of Cuyahoga and State of Ohio, have invented new and useful Improvements in Water-Drawers; and I do hereby declare that the following is a full and complete description of the construction and operation of the same, reference being had to the accompanying drawings, making part of this specification, in which—

Figure 1 is a perspective view. Figs. 2, 3, and 4 are detached sections which will be referred to in the following description; and Figs. 5 and 6 are detached parts, to which reference will also be made in the specification.

The nature of my invention relates to a water-drawer constructed with a bucket, weight, and pulley, the bucket being so arranged in reference to a board or boards or bars extending across the case or curb that while the valve in the bottom of the bucket is opened by means of a rod extending from this valve to the top of the bucket, and a little above it, and by the ascent of the bucket, causing it to press against the under side of the board or bars, the bucket is, by its pressure against the under side of said board or bars, which are placed in an inclined position, caused to swing its lower end forward over the delivery-spout, for the purpose of discharging the water from the valve spout in the bottom of the bucket into the delivery-spout, which extends through the side of the case or curb.

My invention also relates to a flat rope, flat belt, or flat chain, by means of which the bucket is caused to ascend uniformly with the same side towards the delivery-spout, the same effect being produced whether a flat rope, flat belt, or flat chain is used.

In Fig. 1, A represents the case or curb, one side of which is partly broken away to show the arrangement of the apparatus inside for drawing water. B represents the top of the case removed. C represents the pulley that is turned by the crank D, by means of which the bucket E is raised and lowered. F is a weight to which is secured the standards G H, between which revolves the pulley I that rolls upon the flat rope or band S and counterbalances the bucket E. The rope S may be of any length required to suit the depth of the well. A flat band of webbing, rubber belting, or a flat chain may be used for lowering and elevating the bucket, the primary object being to present the same side of the bucket to the delivery-spout.

In Fig. 1 the end of the rope is represented as passing up through an opening in the cross-piece C′ and kept there securely by the key B′, but it can be fastened in any other suitable way.

K represents a board, boards, or bars placed across the case or curb, directly in the line of ascent of the bucket. When an entire board is used, there is an opening in the center through which the rope or belt that is attached to the bucket passes. This board is placed in an inclined position for the purpose of throwing the bottom of the bucket forward over the delivery-spout, as is more fully shown in Fig. 2. This board K may be divided longitudinally, as indicated by the dotted lines *k* in Fig. 1; or two boards may be used for this purpose by placing the two relatively to each other, in an inclined plane, as shown in Fig. 6, so that the back side of the bucket will first come in contact with the bar farthest from the delivery-spout, and by which the bucket is thrown forward in the same manner as by the board K, the valve-rod being thus brought into contact with the front bar, and thereby opening the valve, as herein described.

The rope, belt, or chain being fastened to the bail in the center of the bucket, the bucket will ascend with its top in a horizontal position, and of course it will touch the lower portion of the board K at K′, or the lower bar at K′ first, and the bucket will be in the position shown in Fig. 1. Now, by turning the crank a little more, the rod L that is connected with the valve is forced down by being brought into contact with the under side of the front edge of the board K or its equivalent, the front bar, and with the same movement the bucket is brought up parallel with the board K, or its equivalent, the bars, and is then in the position indicated by the lines E″, bringing the spout F′ of the bucket directly over the spout A′ of the case. Thus with the same motion of the crank that opens the valve to discharge the water from the bucket, the spout E′ is brought over the spout A′. With this arrangement the bucket no sooner begins to descend than it regains its horizontal position; otherwise it would hit against the edge of the spout A′.

Fig. 3 is a vertical section of the bucket, showing the construction and operation of the valve. The lower end of the rod L is jointed to a projection, N, of the valve M. Between the upper and lower pieces forming this valve there is a leather packing, *e*, that extends back and is screwed to the bucket, preventing the bucket from leaking, and also answering the purpose of a flexible joint.

When the bucket is drawn up, the rod L, pressing against the under side of the board K, or its equivalent, as before described, is thereby forced down, and the valve is opened, as indicated by the dotted lines, and the water flows freely out at the opening *a* into the valve-spout E′ and into the discharge-spout A′.

Instead of four ropes joined together, as represented in Fig. 5, there may be any number, two or more. Ropes constructed in this way will not twist or turn like the ordinary single rope—that is, the single ropes of which the flat one is formed must be twisted in opposite directions. As a substantial equivalent the common india-rubber belting or a flat chain (seen also in Fig. 5 at O P) may be used.

When the bucket E is drawn snugly to the under side of the board K, and the water discharged, the weight F, having descended to its lowest point, will be sufficient to keep the upper end of the bucket nearly in contact with the under side of the board K, which will consequently perform the office of a cover to prevent leaves and other matter wafted by the wind from getting into the bucket. At the same time, by means of the same weight F, the valve-stem L will be kept pressed down sufficiently to hold the valve M slightly open, and this will allow a circulation of air through the bucket which will prevent it from becoming foul, as would be the case if a portion of water were allowed to remain in the bottom of the bucket.

Should two bars be used instead of the board K, the upper end of the bucket would not be tightly covered as in the former case, but the top B of the case would afford a sufficient protection against the accumulation of foreign substances in the bucket. The top of the case should be pierced with holes to facilitate the circulation of air, as seen at B.

Instead of the counter-balance weight F, a bucket with all the attachments herein described may be used and discharged in the same manner.

What I claim as my improvement, and desire to secure by Letters Patent, is—

1. The inclined board K, or its substantial equivalent, as herein described, in combination with the spouts A′ and E′, bucket E, valve M, rod L, rope S, or its described equivalent, and counter-balance weight F, the whole being constructed, arranged, and operated in the manner and for the purpose set forth.

2. Throwing the lower end of the bucket forward over the delivery-spout by means of the inclined board K, whether said board is entire or only represented by its operative parts of contact, as herein described, and opening the valve M by the same movement, by means of the rod L, in the manner herein fully set forth.

JAMES DAYKIN.

Witnesses:
W. H. BURRIDGE,
J. HOLMES.